United States Patent
Kanemori et al.

(10) Patent No.: US 9,738,178 B2
(45) Date of Patent: Aug. 22, 2017

(54) GUIDE TRACK FOR TRACK-BASED VEHICLE, AND TRAFFIC SYSTEM

(71) Applicant: MITSUBISHI HEAVY INDUSTRIES, LTD., Tokyo (JP)

(72) Inventors: Toru Kanemori, Tokyo (JP); Hiromichi Yamamoto, Tokyo (JP); Kousuke Katahira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/085,008

(22) Filed: Mar. 30, 2016

(65) Prior Publication Data
US 2016/0207422 A1 Jul. 21, 2016

Related U.S. Application Data

(62) Division of application No. 13/812,998, filed as application No. PCT/JP2011/070021 on Sep. 2, 2011, now Pat. No. 9,321,372.

(30) Foreign Application Priority Data

Feb. 28, 2011 (JP) ................................ 2011-042518

(51) Int. Cl.
*B60M 1/30* (2006.01)
*B60M 1/04* (2006.01)
(Continued)

(52) U.S. Cl.
CPC ............... *B60M 1/307* (2013.01); *B60L 5/38* (2013.01); *B60M 1/04* (2013.01); *B60M 1/30* (2013.01);
(Continued)

(58) Field of Classification Search
CPC .......... B60M 1/30; B60M 1/307; B60M 7/00; B60M 1/04; B60L 5/38; B60L 5/39
(Continued)

(56) References Cited

U.S. PATENT DOCUMENTS 332,926 A * 12/1885 McLaughlin ................... 191/30
727,227 A 5/1903 Thompson
(Continued)

FOREIGN PATENT DOCUMENTS

CN 101044040 9/2007
CN 201122784 9/2008
(Continued)

OTHER PUBLICATIONS

International Search Report issued Dec. 6, 2011 in International (PCT) Application No. PCT/JP2011/070021.
(Continued)

*Primary Examiner* — Mark Le
(74) *Attorney, Agent, or Firm* — Wenderoth, Lind & Ponack, L.L.P.

(57) ABSTRACT

A guide track includes a guide rail having a guide groove opened upward in which guide wheels are inserted, and formed with guide surfaces for causing each of the guide wheels to roll at both sides of a traveling course in a width direction; conductor rails that are placed at both sides of an outside of the traveling course in the width direction with respect to the guide groove to perform contact electricity supply by pressing a power collection shoe of a power collector of a track-based vehicle; a first insulator that supports the conductor rails with respect to the guide rail; and insulation plates that are provided at both sides of the conductor rail in the width direction, and are provided in parallel to the conductor rail and in parallel to a pressing direction of the power collection shoe.

8 Claims, 9 Drawing Sheets

(51) Int. Cl.
*E01B 25/28* (2006.01)
*B60L 5/38* (2006.01)
*B60M 7/00* (2006.01)
*B61B 10/04* (2006.01)

(52) U.S. Cl.
CPC .............. *B60M 7/00* (2013.01); *B61B 10/04* (2013.01); *E01B 25/28* (2013.01); *B60L 2200/26* (2013.01)

(58) Field of Classification Search
USPC ..................................................... 191/30, 31
See application file for complete search history.

(56) References Cited

U.S. PATENT DOCUMENTS

| | | | |
|---|---|---|---|
| 784,238 A | | 3/1905 | Stillwell |
| 876,489 A | * | 1/1908 | Rappleye ................. B60M 1/30 191/22 R |
| 908,136 A | * | 12/1908 | Randolph .............. B60M 1/307 191/32 |
| 921,508 A | | 5/1909 | Burgess |
| 1,739,591 A | * | 12/1929 | Holzel ..................... B60M 1/04 191/30 |
| 3,672,308 A | | 6/1972 | Segar |
| 4,089,272 A | | 5/1978 | Schmitz |
| 5,373,926 A | | 12/1994 | Clarke et al. |
| 6,520,303 B1 | | 2/2003 | Malek et al. |
| 2009/0259352 A1 | | 10/2009 | Morichika et al. |

FOREIGN PATENT DOCUMENTS

| | | |
|---|---|---|
| CN | 101421142 | 4/2009 |
| GB | 20917 | 0/1911 |
| JP | 2000-142386 | 5/2000 |
| JP | 2005-231484 | 9/2005 |
| JP | 2008-114753 | 5/2008 |
| JP | 2008-143265 | 6/2008 |
| JP | 2010-221950 | 10/2010 |

OTHER PUBLICATIONS

Written Opinion of the International Searching Authority issued Dec. 6, 2011 in International (PCT) Application No. PCT/JP2011/070021.

Korean Decision for Grant of Patent issued Aug. 20, 2014 in corresponding Korean Patent Application No. 10-2012-7032888 with English translation.

Chinese Office Action issued Sep. 2, 2014 in corresponding Chinese Patent Application No. 201180037279.5 with English translation.

U.S. Office Action dated Feb. 20, 2015 issued in U.S. Appl. No. 13/812,998.

U.S. Office Action dated Jul. 10, 2015 issued in U.S. Appl. No. 13/812,998.

U.S. Advisory Action dated Nov. 2, 2015 issued in U.S. Appl. No. 13/812,998.

U.S. Notice of Allowance dated Dec. 23, 2015 issued in U.S. Appl. No. 13/812,998.

* cited by examiner

GUIDE TRACK FOR TRACK-BASED
VEHICLE, AND TRAFFIC SYSTEM

TECHNICAL FIELD

The present invention relates to a guide track for a track-based vehicle used for a track-based new transportation system or the like, and a transportation system. Priority is claimed from Japanese Patent Application No. 2011-042518 filed on Feb. 28, 2011, the contents of which are incorporated herein by reference.

BACKGROUND ART

Transportation systems of a center guide type have been known from the related art. In such transportation systems of the center guide type, a power collector for supplying electricity from a conductor rail is attached to a guide device, and is designed and placed so as not approach more than a required insulation separation distance by a relative displacement.

Furthermore, in the case of a direct current type, although there is also a structure in which a positive electric cable is attached to a traveling road side, and a negative electric cable uses a guide rail, a rubber tire type new transportation system generally has a structure in which the positive electric cable and the negative electric cable are installed side by side at the traveling road side or provided in parts at the left and right traveling road sides. In this case, since a guidance guide is located below a traveling road surface due to a large guide wheel, a conductor rail is also located below the traveling road surface. Furthermore, the guide rail and the conductor rail are separately provided at sufficiently remote positions so as to secure the insulation separation. In this manner, in the center guide type, since the conductor rail is located below the traveling road surface and is provided at a position separated from the guide rail, a track space is required below the traveling road surface. For this reason, a cross-sectional area for forming the track increases, and when there is a tunnel portion or the like, enormous costs may be incurred.

On the other hand, there are transportation systems using a center guide type that uses an H-steel beam as the guidance guide of the guide wheel (for example, see U.S. Pat. No. 6,520,303). In this case, a conductor rail of a positive pole (positive electric cable) and a conductor rail of a negative pole (negative electric cable) are attached to a web of the H-steel beam via an insulator. As a result, since both conductor rails are placed inside the guide, there is provided a guide track of a configuration in which both conductor rails can be placed on the traveling road surface.

Problems to be Solved by Invention

However, there has been a problem that will be mentioned below in a guide track using a center guide type of the related art.

That is, U.S. Pat. No. 6,520,303 has a configuration in which a conductor rail is placed in a guidance guide formed by the H-steel beam. For this reason, there was a problem in that an insulation distance between a positive electric cable and a negative electric cable is shortened and thus a short circuit easily occurs.

Summary of Invention

The present invention has been achieved in view of the above circumstances, and an object thereof is to provide a guide track for a track-based vehicle and a transportation system capable of preventing a short circuit between a conductor rail (charging units) and a short circuit to the charging units due to a vehicle and other structural members, by securing a required insulation distance and protecting the charging units.

Means for Solving the Problems

In order to achieve the above-mentioned object, according to a first aspect of the present invention, there is provided a guide track for a track-based vehicle that guides the track-based vehicle to follow a predetermined traveling course by causing a pair of guide wheels provided in the track-based vehicle to roll, the guide track including: a track main body having a guide groove opened upward in which the pair of guide wheels inserted, and is formed with a pair of guide surfaces for causing each of the pair of guide wheels to roll at both sides of the traveling course in a width direction; a conductor rail that is placed on at least one side of the outside of the traveling course in the width direction with respect to the guide groove to perform contact electricity supply by pressing a power collection shoe of a power collector of the track-based vehicle; a support portion that is formed of an insulation material and supports the conductor rail with respect to the track main body portion; and at least a protection member serving as an insulation material that is provided on both sides in the width direction or the upper part of the vertical direction of the conductor rail, and is provided in parallel to the conductor rail and in parallel to a pressing direction of the power collection shoe so as to prevent a short circuit due to the contact with the conductor rail in the width direction or the vertical direction.

In the guide track according to the first aspect of the present invention, the guide wheel is placed in the guide groove of the track main body, the conductor rail are provided at both sides of the track main body in the width direction via the support portion, and the positive electric cable and the negative electric cable are installed at both sides with the track main body interposed therebetween. Thus, the separation between the positive electric cable and the negative electric cable can be increased. For this reason, the guide track according to the first aspect of the present invention is able to greatly secure the insulation distance compared to a case of placing the positive electric cable and the negative electric cable in the guide groove of the guide rail of the related art, and thus a short circuit between the layers can be prevented.

Furthermore, in the guide track according to the first aspect of the present invention, in an insulation separation range of the conductor rail (charging unit), at least the protection member serving as the insulation material is provided at both sides of the conductor rail in the width direction or at the upper part of the conductor rail in the vertical direction, and is provided parallel to the conductor rail and parallel to the pressing direction of the power collection shoe. As a result, the insulation separation range can be reduced, and thus it is possible to secure a suitable insulation separation between the conductor rail and the track-based vehicle. In addition, it is possible to secure a required insulation distance with respect to airborne substance from outside of the track, and thus the charging unit can be protected. For this reason, it is possible to prevent a short circuit of the conductor rail forming the charging unit due to the vehicle and other structural members.

Moreover, when the protection member is provided above the conductor rail, it is possible to prevent rainwater from splashing the conductor rail, and thus the early abrasion of the power collection shoe can be prevented during rainfall. For this reason, it is possible to extend a check and exchange period of the power collection shoe, and thus the reduction of the maintenance cost can be promoted.

Furthermore, when providing the protection members at both sides of the conductor rail in the width direction, it is possible to suitably secure the insulation separation between the conductor rail and each portion of the vehicle. Moreover, since there is a structure in which the power collection shoe of the power collector is pressed from the top to the bottom, followability to the conductor rail in combination with the action of self-weight is satisfactory, and thus the line is not easily separated from the shoe.

In addition, in the guide track according to the first aspect of the present invention, since the conductor rails are placed at both sides of the track main body in the width direction, it is possible to place the track main body and the conductor rails on the traveling road surface. As a result, there is no need for a space below the traveling road surface, and thus significant cost reduction can be promoted.

In addition, although an inside of the track also may serve as a refuge passage when the vehicle is broken down, since the conductor rail is protected by the protection member even when turning a power source OFF during refuge, even if the conductor rail (charging unit) is switched on by mistake, safety is secured.

Furthermore, according to a second aspect of the present invention, the support portion may be formed from an accommodation concave portion capable of accommodating the conductor rail, and the accommodation concave portion may also form the protection member.

In the guide track according to the second aspect of the present invention, the accommodation concave portion forms the support portion configured to support the conductor rail and the track main body, and also serves as the protection member. As a result, there is no need to provide a separate protection member, the number of the components can be reduced, and thus the reduction of the costs can be promoted.

According to a third aspect of the present invention, the conductor rail may have one of a groove or a convex portion to be engaged with each other that extends in a front and back direction of the traveling course along the traveling course, the support portion may have the other of the groove or the convex portion provided on an inner surface forming the accommodation concave portion.

In the guide track according to the third aspect of the present invention, the conductor rail can be fixed in the accommodation concave portion by engaging the other of the groove or the convex portion of the accommodation concave portion with the one of the groove or the convex portion of the conductor rail.

Furthermore, according to a fourth aspect of the present invention, there is provided a transportation system that includes the guide track of the above-mentioned track-based vehicle, and the track-based vehicle that is guided by the guide track and runs.

In the transportation system according to the fourth aspect of the present invention, since the above-mentioned guide track is provided in the track-based vehicle, a short circuit of the vehicle and other structural members to the conductor rail can be prevented, a required insulation distance can be secured, and thus the vehicle and other structural members can be protected from the conductor rail.

Furthermore, according to a fifth aspect of the present invention, a separation interval of the pair of guide surfaces of the guide track may be set to be smaller than the sum of diameters of the pair of guide wheels, and the pair of guide wheels of the track-based vehicle may be provided so that positions thereof in the front and back direction along the traveling course are different from each other.

According to the transportation system according to the fifth aspect of the present invention, it is possible to reduce the distance in the width direction of the guide groove of the track main body with the pair of guide wheels placed thereon. As a result, it is possible to reduce the installation space of the guide track, and thus it is possible to effectively use the space between the vehicle and the traveling road surface.

Effects of Invention

According to the guide track of the track-based vehicle and the transportation system of the present invention, there is provided a configuration in which the guide wheel is placed in the guide groove of the track main body, and the conductor rail is provided outside the guide wheel via the support portion. As a result, since the separation between the positive electric cable and the negative electric cable can be increased, a short circuit between the conductor rails can be prevented.

Furthermore, by providing the conductor rail (charging unit) with the protection member, it is possible to reduce the insulation separation range of the conductor rail and secure the required insulation distance, and the conductor rail is protected. For this reason, it is possible to prevent a short circuit between the conductor rails, and a short circuit of the conductor rail with the vehicle and other structural members.

DETAILED DESCRIPTION OF THE INVENTION

Hereinafter, a guide track of a track-based vehicle and a transportation system according to an embodiment of the present invention will be described with reference to the accompanying drawings.
(First Embodiment)

Figure 1:
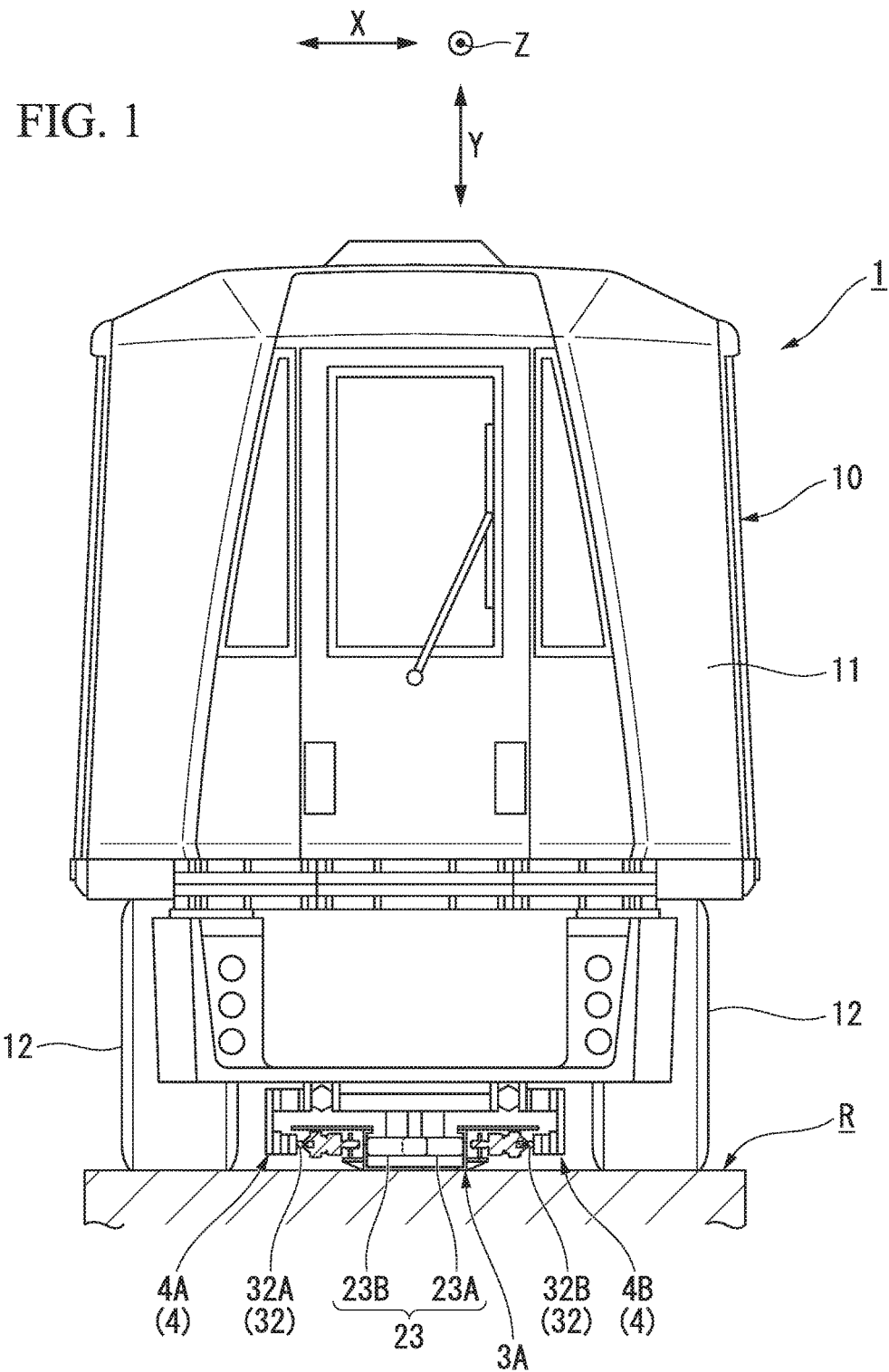
FIG. 1 is partial cross-sectional view that illustrates an outline of a transportation system according to a first embodiment of the present invention.

As illustrated in FIG. 1, a transportation system 1 according to a first embodiment of the present invention adopts a center guide type. The transportation system 1 includes a track-based vehicle 10, and a guide track 3A for guiding a pair of guide wheels 23 (23A and 23B) provided in the track-based vehicle 10 so as to follow a predetermined traveling course by causing the guide wheels to roll.

Figure 2:
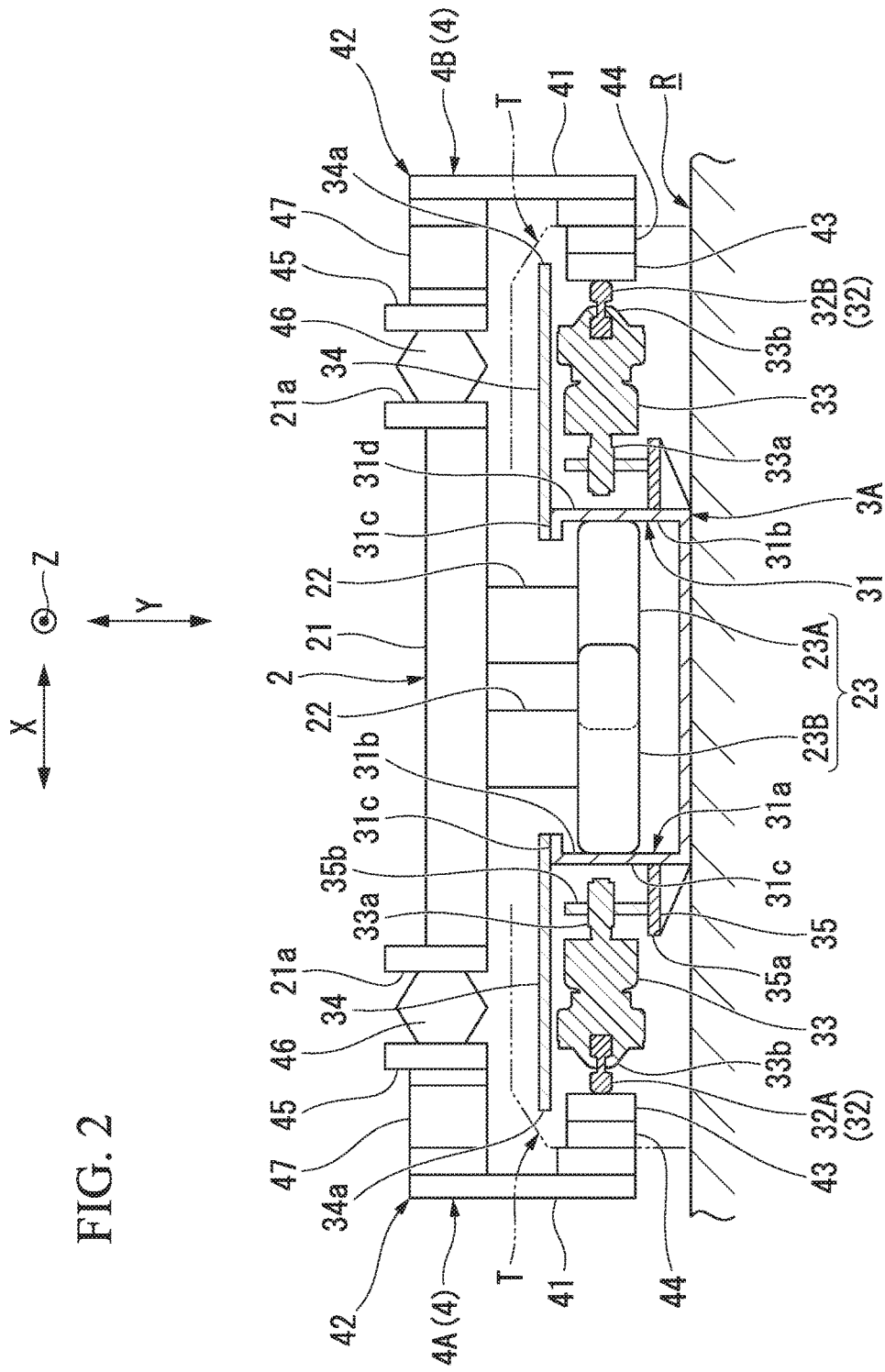
FIG. 2 is a side view that illustrates a configuration of a guide track 3A of a track-based vehicle illustrated in FIG. 1.
Figure 3:
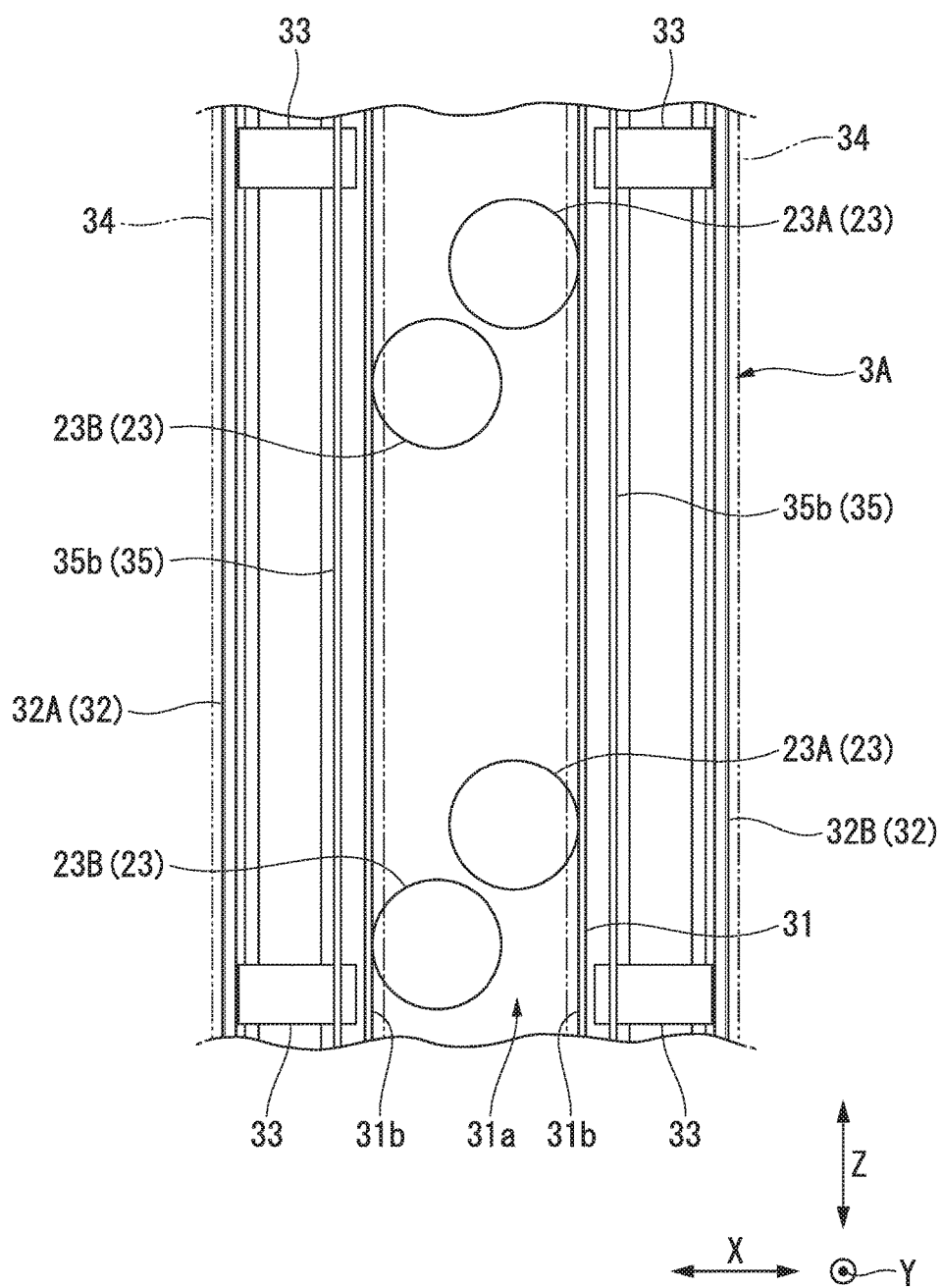
FIG. 3 is a plane view of the guide track 3A illustrated in FIG. 2.

Herein, in FIGS. 1 and 2, a left and right direction of a plane of paper is referred to as a vehicle width direction X, a direction perpendicular to the plane of paper is referred to as a front and back direction Z, and an up and down direction of the plane of paper is referred to as a vertical direction Y The track-based vehicle 10 includes a vehicle body 11, running wheels 12 and 12 provided at both sides of the vehicle body 11 in the width direction, a guide device 2 configured to guide the vehicle body 11 along the traveling course, and a power collector 4 coming into contact with a conductor rail 32 (described later) of a guide track 3A provided along the traveling course to supply electricity.

Herein, a traveling road surface R on which the running wheels 12 run is a flat surface throughout the entire surface. Moreover, at a central position on the traveling road surface R in the width direction X, that is, between both running wheels 12 and 12 in the width direction, the guide track 3A is laid along a front and back direction Z of the traveling course. In addition, although the guide track 3A is at a central position in the width direction X in the first embodiment of the present invention, the position is not limited thereto, and the position may deviate from the center to either a left side or a right side if the position is between the left and right running wheels 12 and 12.

As illustrated in FIGS. 1 and 2, in the guide device 2 that is provided at the vehicle body 11 side and includes the guide wheels 23A and 23B, a guide frame 21 is provided at a central position in the width direction X of a lower surface side of the vehicle body 11, and rotation shafts 22 are alternately placed on the lower surface of the guide frame 21 in the width direction X along the front and back direction Z so that a central axis thereof faces in a vertical direction Y. Moreover, in a lower end of each rotation shaft 22, the guide wheels 23 (23A and 23B) are placed coaxially and rotatably around the rotation shafts 22. Power collectors 4 (a positive power collector 4A and a negative power collector 4B) to be described later are each placed at both sides of the guide frame 21 in the width direction.

As illustrated in FIG. 2, the guide track 3A includes a guide rail 31 (track main body) that is opened upward and has a guide groove 31a into which a pair of left and right guide wheels 23A and 23B are inserted, conductor rails 32 (a positive electric cable 32A and a negative electric cable 32B) that are placed at both external sides of the traveling course in the width direction X at predetermined intervals with respect to the guide groove 31a and perform the contact electricity supply by the power collector 4 of the track-based vehicle 10, a first insulator 33 (support portion) that is formed of an insulator material and supports the conductor rails 32A and 32B with respect to the guide rail 31, and a tabular insulation plate 34 (protection member) that is placed above the conductor rails 32A and 32B in the vertical direction.

The guide rail 31 is formed in substantially a U shape when viewed from a cross section that is opened upward at a central position in the traveling road surface R in the width direction, and extends along the front and back direction Z. Moreover, at both sides of the guide groove 31a in the width direction, a pair of guide surfaces 31b and 31b for causing each of the pair of guide wheels 23A and 23B to roll are provided at facing positions. Brackets 35 for fixing the first insulator 33 supporting the pair of conductor rails 32A and 32B are provided at both external sides of the guide rail 31.

Moreover, the separation interval of the pair of guide surfaces 31b and 31b is set to be smaller than the sum of the diameters of the pair of guide wheels 23A and 23B, and the pair of guide wheels 23A and 23B of the track-based vehicle 10 are placed in the front and back direction Z along the traveling course so that positions thereof are different from each other. Thereby, it is possible to reduce a distance in the width direction X of the guide groove 31a of the guide rail 31 on which the pair of guide wheels 23A and 23B are placed. As a result, the installation space of the guide track 3A can be reduced, and thus it is possible to effectively use the space between the track-based vehicle 10 and the traveling road surface R.

The bracket 35 is a member for laterally attaching the first insulator 33. The bracket 35 includes a horizontal member 35a protruding outward in the width direction from the external surface 31d of the guide rail 31, and a longitudinal member 35b provided so as to stand on an upper surface of the horizontal member 35a. A proximal end 33a which is one end of the first insulator 33 in an axial direction is fixed to the longitudinal member 35b using fixing means such as a bolt and a nut.

The conductor rail 32 includes a positive electric cable 32A for positive current of a left side of a plane of paper of FIG. 2, and a negative electric cable 32B for negative current at a right side of the plane of paper of FIG. 2. The conductor rails 32A and 32B are laterally supported by the conductor rail support end 33b which is the other end of the first insulator 33. At this time, the pair of conductor rails 32A and 32B are each placed outward in the width direction. In addition, an interval in the width direction X between the positive electric cable 32A and the negative electric cable 32B is a distance corresponding to a dimension in the width direction in which the guide rail 31, the brackets 35 and 35 and the first insulators 33 and 33 are placed.

The insulation plate 34 is provided to prevent a short circuit due to contact with the conductor rails 32A and 32B in the vertical direction Y. The insulation plate 34 extends outward in the width direction from the upper ends 31c of both sides of the guide rail 31, and is placed to cover each of the upper parts of the positive electric cable 32A and the negative electric cable 32B. That is, a plane direction of the insulation plate 34 is parallel to the conductor rail 32, and the insulation plate 34 is provided parallel to a pressing direction (corresponding to the width direction X) of a power collection shoe 43 to be described later. Moreover, an extended end 34a of the insulation plate 34 is placed outside each of the conductor rails 32A and 32B in the width direction.

The power collector 4 is attached to the guide frame 21 of the above-mentioned guide device 2. Herein, a left side of the plane of paper of FIG. 1 is a positive power collector 4A performing contact electricity supply to the positive electric cable 32A, and a right side of the plan of paper of FIG. 1 is a negative power collector 4B performing the contact electricity supply to the negative electric cable 32B.

The positive power collector 4A and the negative power collector 4B each include an attachment plate 41 in which a plane direction faces in a direction perpendicular to the width direction X. The attachment plates 41 include a device support portion 42 fixed to the guide frame 21 of the guide device 2, and a power collection shoe 43 that is pressed to the conductor rail 32 to perform the contact electricity supply by biasing force of a link mechanism with a spring 47. In addition, the power collection shoe 43 is attached to the attachment plate 41 via a pin portion 44 so as to correspond to swing of the power collection shoe 43 in an end approach or the like of the conductor rail 32.

The device support portion 42 includes a second insulator 46 and an insulation member 45 to be fixed to the side surface 21a of the guide frame 21 of the guide device 2, and the link mechanism with the spring 47 for giving biasing force in a central direction to the attachment plate 41.

Next, the operation of the guide track 3A of the track-based vehicle 10 and the transportation system 1 configured as mentioned above will be described based on the drawings.

As illustrated in FIG. 2, in the present embodiment, there is provided a configuration in which the guide wheels 23A and 23B are placed in the guide groove 31a of the guide rail 31, the conductor rails 32A and 32B are provided at both sides of the guide rail 31 in the width direction via the first insulator 33, and the positive electric cable 32A and the negative electric cable 32B are placed at both sides with the guide rail 31 interposed therebetween. For this reason, it is possible to increase the separation distance between the positive electric cable 32A and the negative electric cable 32B. As a result, the insulation distance can be greatly secured compared to a case of placing the positive electric cable and the negative electric cable in the guide groove of the guide rail of the related art, and thus a short circuit between the layers can be prevented.

Furthermore, in the present embodiment, in an insulation separation range T (two-dot chain line illustrated in FIG. 2) of the conductor rails 32A and 32B, the insulation plate 34 serving as the insulation material is provided above the conductor rails 32A and 32B in the vertical direction. In addition, the insulation plate 34 is provided so that a plane thereof is parallel to the conductor rails 32A and 32B and parallel to the pressing direction of the power collection shoe 43. As a result, the insulation separation range T can be reduced, and thus it is possible to secure suitable insulation separation between the conductor rails 32A and 32B and the track-based vehicle 10 (FIG. 1). In addition, since it is possible to secure a required insulation distance with respect to airborne substances from outside of the track to protect the charging unit, it is possible to prevent a short circuit of the conductor rails 32A and 32B forming the charging unit due to the track-based vehicle 10 and other structural members.

Moreover, in the present embodiment, the insulation plate 34 is placed above the conductor rails 32A and 32B. For this reason, it is possible to prevent rainwater from affecting the conductor rails 32A and 32B. As a result, it is possible to prevent the early abrasion of the power collection shoe 43 at the time of rainfall, it is possible to extend the check and the exchange period of the power collection shoe 43, and thus reduction of the maintenance costs can be promoted.

In addition, since the conductor rails 32A and 32B are placed at both sides of the guide rail 31 in the width direction, it is possible to place the guide rail 31 and the conductor rails 32A and 32B on the traveling road surface R. As a result, there is no need for a space below the traveling road surface R, and thus significant cost reduction can be promoted.

In addition, although the inside of the track serves as a shelter passage when the vehicle is malfunctions, since the conductor rails 32A and 32B are protected by the insulation plate 34 even if the power source is turned OFF during shelter, even if the conductor rails 32A and 32B are switched on by mistake, safety is secured.

The guide track of the track-based vehicle and the transportation system according to the above-mentioned first embodiment of the present invention have a configuration in which the guide wheels 23A and 23B are placed in the guide groove 31a of the guide rail 31, and the conductor rails 32A and 32B are provided at both sides of the guide rail 31 in the width direction via the first insulator 33. As a result, it is possible to increase the separation distance between the positive electric cable 32A and the negative electric cable 32B, and thus a short circuit between the conductor rails 32A and 32B can be prevented.

Furthermore, as the insulation plate 34 is provided in the conductor rail 32, it is possible to reduce the insulation separation range T of the conductor rail 32, and thus the required insulation distance can be secured. In addition, since the conductor rail 32 is protected, it is possible to prevent a short circuit between the conductor rails 32A and 32B and a short circuit of the conductor rail 32 with the track-based vehicle 10 and other structural members.

Next, another embodiment and a modified example according to the guide track of the track-based vehicle and transportation system of the present invention will be described based on the accompanying drawings. In addition, the descriptions of the same or similar members or portions as those of the above-mentioned first embodiment are omitted using the same reference numerals, and configurations different from those of the first embodiment will be described.

(Second Embodiment)

Figure 4:
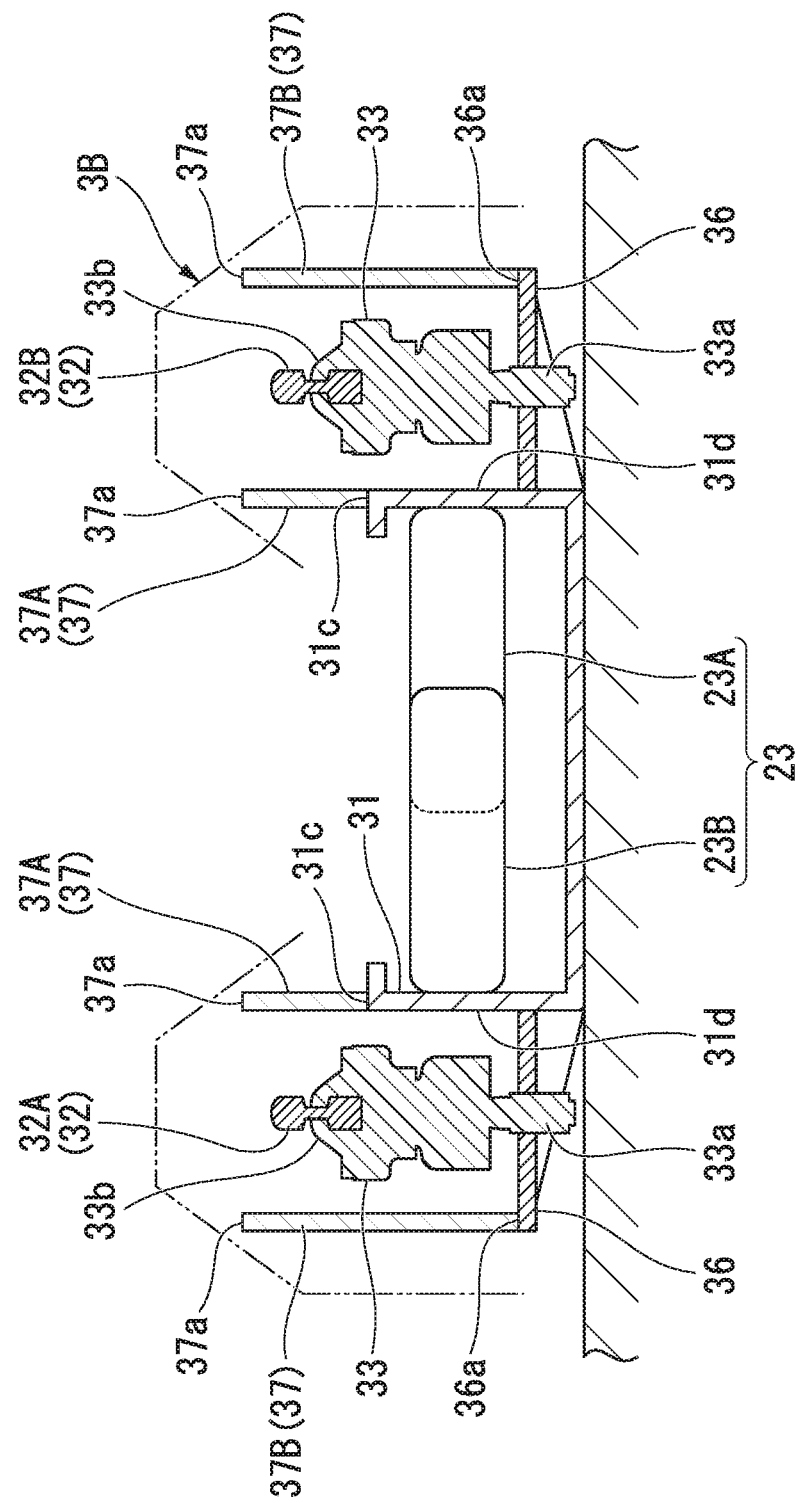
FIG. 4 is a side view that illustrates a configuration of a guide track 3B of a track-based vehicle according to a second embodiment of the present invention.

As illustrated in FIG. 4, a guide track 3B of a track-based vehicle according to a second embodiment of the present invention has a configuration in which brackets 36 for supporting the conductor rails 32A and 32B are provided at both sides of the guide rail 31, the first insulator 33 is vertically attached to the brackets 36, and the conductor rails 32A and 32B are supported by a conductor rail support end 33b of the first insulator 33.

Herein, since the configurations of the guide rail 31, the first insulator 33, the positive electric cable 32A, and the negative electric cable 32B are the same as those of the above-mentioned first embodiment, the detailed descriptions thereof will be omitted herein.

Herein, FIG. 4 is a diagram that illustrates only the guide wheels 23 (23A and 23B) of the guide device while omitting the power collector.

The bracket 36 is a member for perpendicularly (vertically) attaching the first insulator 33. The bracket 36 is configured to protrude outward in the width direction from the external surface 31d of the guide rail 31. A proximal end 33a which is one end of the first insulator 33 in an axial direction is fixed onto the bracket 36 by fixing means such as a bolt and a nut.

In addition, in the guide track 3B according to the second embodiment of the present invention, the insulation plates 37 (37A and 37B) (protection members) are each provided at both sides in the width direction of the positive electric cable 32A and the negative electric cable 32B in a vertically standing manner. Moreover, the position of the upper end 37a of the insulation plate 37 is located above the conductor rails 32. In the width direction, one internal insulation plate 37A located at the guide wheel 23 side is provided in the upper end 31c of the guide rail 31, and the other external insulation plate 37B is provided in a protrusion edge end 36a of the bracket 36.

In the guide track 3B according to the second embodiment having such a configuration, as in the above-mentioned first embodiment, the positive electric cable 32A and the negative electric cable 32B are provided at both sides with the guide rail 31 interposed therebetween. For this reason, it is possible to suppress an occurrence of short circuit between the layers or the like.

Furthermore, since the insulation plates 37A and 37B are provided at both sides of the conductor rails 32A and 32B in the width direction, it is possible to suitably secure the insulation separation between the conductor rails 32A and 32B and the units of the vehicle. Moreover, since a power collection shoe of a power collector not illustrated has a configuration pressed from the top to the bottom, followability to the conductor rails 32A and 32B is improved in combination with the action due to its own weight, and the line is not easily separated.

(Third Embodiment)

Figure 5:
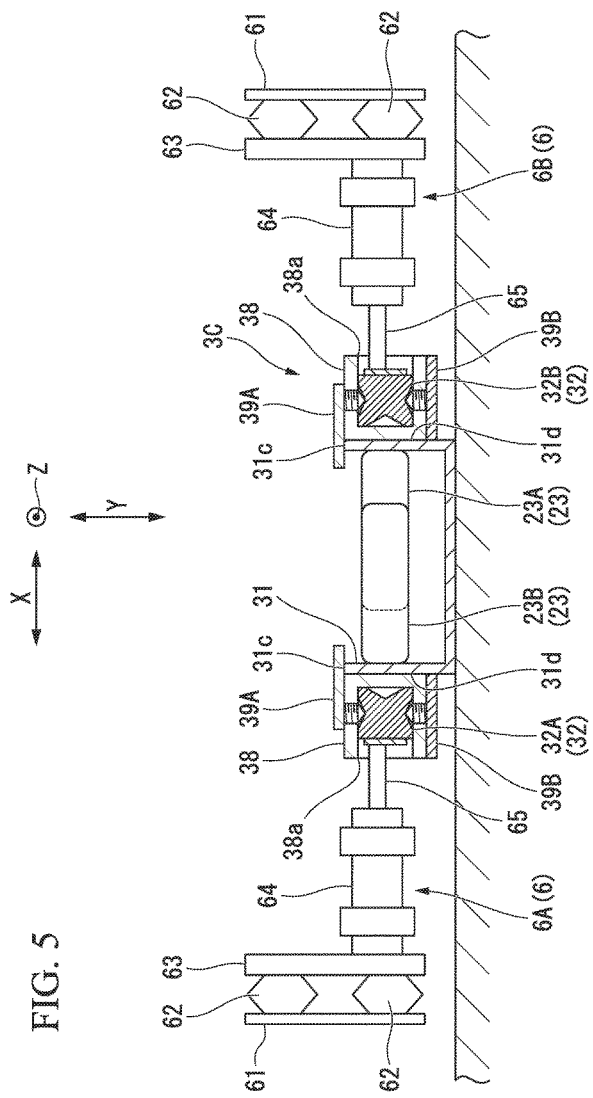
FIG. 5 is a side view that illustrates a configuration of a guide track 3C of a track-based vehicle according to a third embodiment of the present invention.

Next, a guide track 3C for a track-based vehicle according to a third embodiment of the present invention illustrated in FIG. 5 has a configuration in which the respective support portions of the positive electric cable 32A and the negative electric cable 32B also serve as insulation plates (protection members).

That is, the guide track 3C is provided with an accommodation concave portion 38 (a support portion, and a protection member) formed of an insulation material capable of accommodating the conductor rail 32 along both external surfaces 31d of the guide rail 31 (track main body) in the width direction X. The accommodation concave portion 38 forms a U shape when viewed from a cross section, and is placed so that an opening portion 38a side thereof faces outward in the width direction. Moreover, the accommodation concave portion 38 is fixed in a state of being fitted between a pair of brackets 39A and 39B protruding outward in the width direction from two upper and lower locations of the upper end 31c of the external surface 31d and the lower part of the external surface 31d of the guide rail 31.

Figure 6:
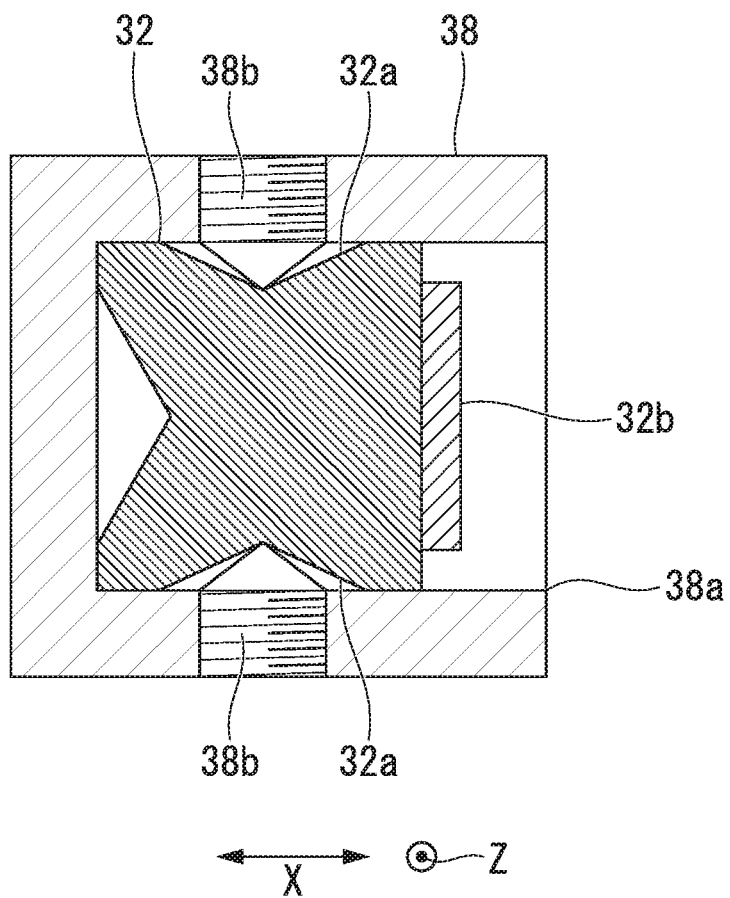
FIG. 6 is an enlarged view of an accommodation concave portion that accommodates the conductor rail illustrated in FIG. 5.

Herein, as illustrated in FIG. 6, the conductor rail 32 accommodated in the accommodation concave portion 38 has a shape that is different from those of the above-mentioned first and second embodiments. The conductor rail 32 has a pair of upper and lower grooves 32a and 32a engaged with each other that extend in the front and back direction Z along the traveling course. Moreover, a shoe contact surface 32b is provided at the end surface of the opening portion 38a side of the accommodation concave portion 38.

Moreover, in the accommodation concave portion 38, bolts 38b and 38b (convex portions) formed of an insulation material protruding to the inner surface side forming the accommodation concave portion 38 are provided at positions corresponding to the pair of grooves 32a and 32a of the conductor rail 32. That is, as the bolts 38b and 38b of the accommodation concave portion 38 are engaged with the grooves 32a and 32a of the conductor rail 32, the conductor rail 32 is fixed into the accommodation concave portion 38. In addition, the bolt 38b may be fixed to the groove 32a such that it is lightly fastened, and may be fixed so as not to restrict expansion of the conductor rail 32 due to the temperature. Furthermore, the opening portion 38a of the accommodation concave portion 38 is located outside the shoe contact surface 32b of the conductor rail 32 in the width direction X.

Furthermore, as illustrated in FIG. 5, power collectors 6 (6A and 6B) according to a third embodiment of the present invention include an attachment plate 61, a plate-like insulator 63 fixed to the attachment plate 61 via an insulator 62, and a pantograph 64 installed in the insulator 63. In addition, a power collection shoe 65 is installed at a leading end of the pantograph 64, and the power collection shoe 65 is pressed to the conductor rail 32 using spring force of the pantograph 64 to perform the contact electricity supply.

In the guide track 3C according to the third embodiment having such a configuration, as in the above-mentioned embodiments, since the positive electric cable 32A and the negative electric cable 32B are provided at both sides with the guide rail 31 interposed therebetween, the occurrence of a short circuit between the layers or the like can be suppressed. In addition, since the conductor rail 32 and the accommodation concave portion 38 can be miniaturized by being integrally provided, the space can be reduced.

Furthermore, the accommodation concave portion 38 forms the support portion that supports the conductor rail 32 and the guide rail 31, and also functions as the protection member. For this reason, since there is no need to provide a separate protection member, the number of components can be reduced, and thus reduction of the cost can be promoted.

(First Modified Example)

Figure 7:
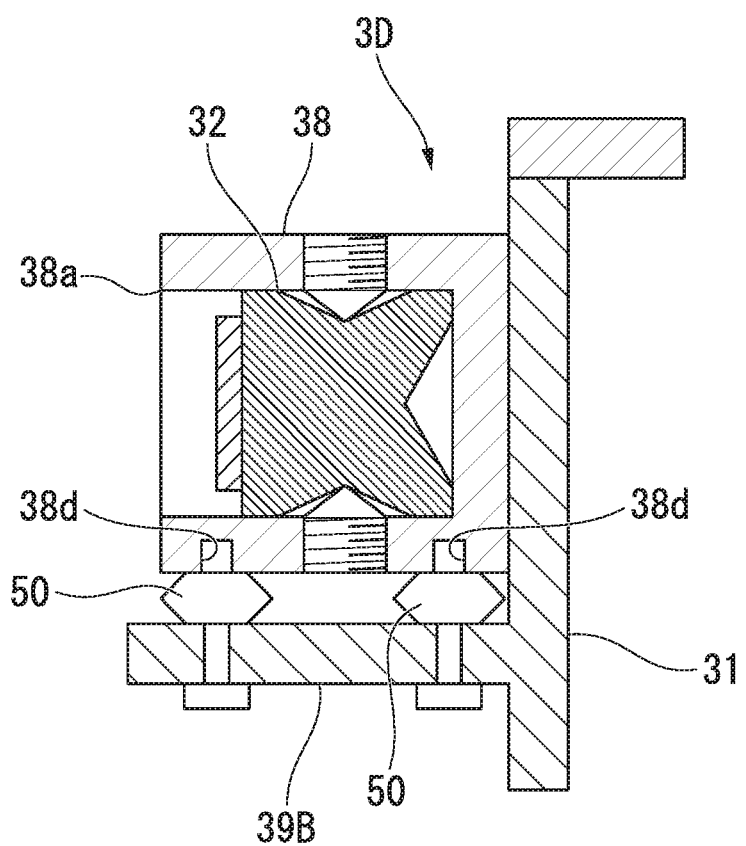
FIG. 7 is a partial side view of a guide track 3D according to a first modified example of the present invention.

Next, a guide track 3D according to a first modified example illustrated in FIG. 7 is different from the above-mentioned third embodiment in a structure in which the accommodation concave portion 38 accommodating the conductor rail 32 is provided. That is, in the present modified example, the upper bracket 39A (see FIG. 5) of the third embodiment is omitted, and the accommodation concave portion 38 is fixed onto the lower bracket 39B via the third insulators 50 and 50. The accommodation concave portion 38 in this case has an engagement portion 38d for the third insulator 50, and other configurations are the same as those of the third embodiment.

(Second Modified Example)

Figure 8:
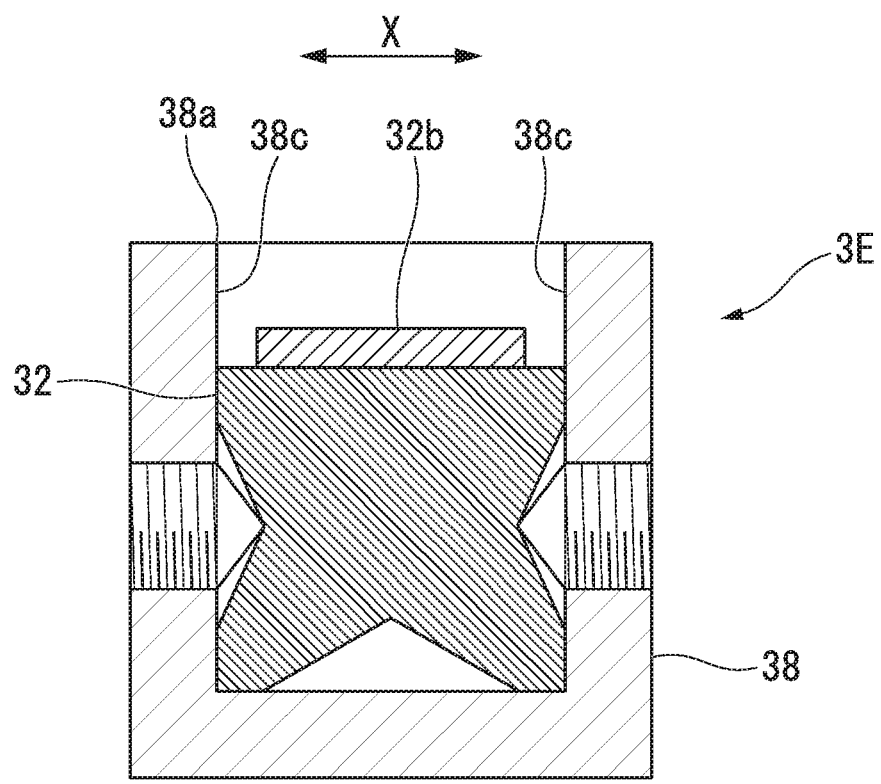
FIG. 8 is a partial side view of a guide track 3E according to a second modified example of the present invention.

Next, in a guide track 3E according to a second modified example illustrated in FIG. 8, in the above-mentioned third embodiment, the opening portion 38a of the accommodation concave portion 38 accommodating the conductor rail 32 faces upward. That is, two surfaces of the accommodation concave portion 38 placed to face each other form side surfaces 38c and 38c facing each other in the width direction X, and the shoe contact surface 32b of the internal conductor rail 32 is located at the opening portion 38a side of the accommodation concave portion 38 to face upward. Moreover, the shoe contact surface 32b is located lower than the opening portion 38a.

(Third Modified Example)

Figure 9:
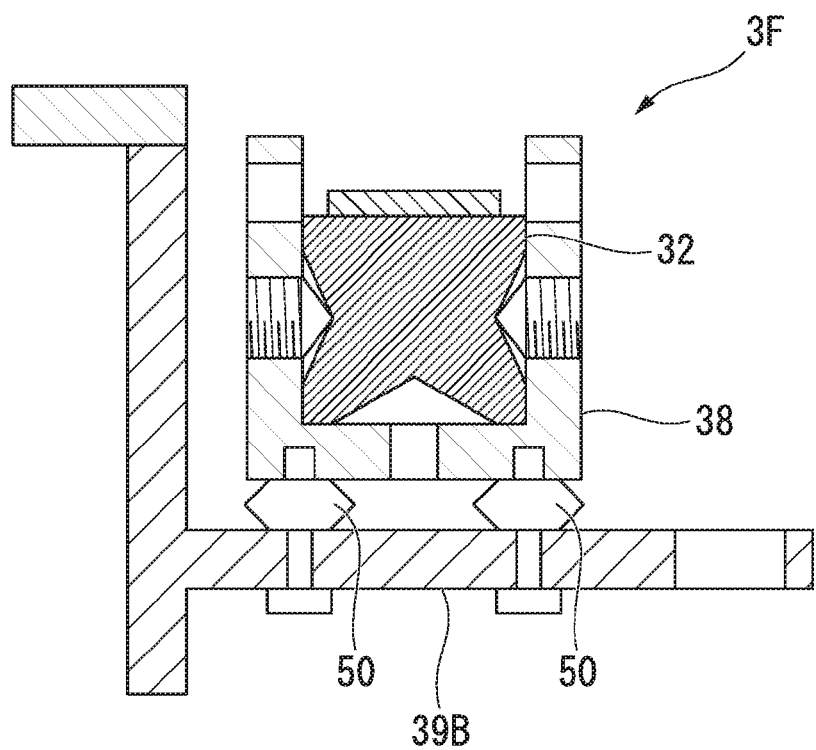
FIG. 9 is a partial side view of a guide track 3F according to a third modified example of the present invention.

Next, in a guide track 3F according to a third modified example illustrated in FIG. 9, the accommodation concave portion 38 accommodating the conductor rail 32 of the above-mentioned second modified example accommodated therein is fixed onto the lower bracket 39B according to the first modified example via the third insulators 50 and 50.

Although the embodiments of the guide track for a track-based vehicle and the transportation system according to the present invention have been described above, the present invention is not limited to the above-mentioned embodiments, but can be suitably changed without departing from the spirit thereof.

For example, it is possible to suitably set the shapes and the sizes of the guide wheels 23A and 23B, the positions of the conductor rails 32A and 32B, the configuration of the power collector 4, and the kind, the size and the configuration of each insulator.

Furthermore, it is also possible to arbitrarily set the configurations such as the dimensions, the positions (separation from the conductor rail 32), the members and the attachment positions of the insulation plates 34 and 37, depending on the conditions such as the position, the shape, and the insulation separation range T of the conductor rail 32.

In addition, it is possible to suitably replace the components in the above-mentioned embodiments with well-known components, and the above-mentioned embodiments may be suitably combined with each other within a scope that does not depart from the spirit of the present invention.

INDUSTRIAL APPLICABILITY

According to the present invention, since it is possible to increase the separation between the positive electric cable and the negative electric cable, a short circuit between the conductor rails can be prevented.

DESCRIPTION OF REFERENCE NUMERALS 1 transportation system
2 guide device
3A, 3B, 3C, 3D, 3E, 3F guide track
4 power collector
4A positive power collector
4B negative power collector
10 track-based vehicle
11 vehicle body
23, 23A, 23B guide wheel
31 guide rail (track main body)
31a guide groove
31b guide surface
32 conductor rail
32A positive electric cable
32B negative electric cable
32a groove
33 first insulator (support portion)
34, 37 insulation plate (protection member)
38 accommodation concave portion (support portion, protection member)
38b bolt (convex portion)
43 power collection shoe
R traveling road surface
X width direction
Y vertical direction
Z front and back direction

The invention claimed is:

1. A guide track for a track-based vehicle that guides the track-based vehicle to follow a predetermined traveling course by causing a pair of guide wheels in the track-based vehicle to roll, the guide track comprising:
   a track main body having a guide groove opened upward in which the guide wheels are inserted, and a pair of guide surfaces for causing the pair of guide wheels to roll at both sides of the predetermined traveling course in a width direction;
   a conductor rail that is positioned on at least one side of an outside of the predetermined traveling course in the width direction with respect to the guide groove to perform contact electricity supply by pressing a power collection shoe of a power collector of the track-based vehicle;
   a support portion that includes an insulation material and supports the conductor rail with respect to the track main body; and
   a protection member serving as an insulation material that is at least on both sides in a width direction or an upper part of a vertical direction of the conductor rail, and is in parallel to the conductor rail and in parallel to a pressing direction of the power collection shoe so as to prevent a short circuit due to contact with the conductor rail in the width direction or the vertical direction,
   wherein the support portion includes an accommodation concave portion capable of accommodating the conductor rail,
   wherein the conductor rail has concave portions that extend in a front and back direction along the predetermined traveling course, the concave portions being defined on both sides of the conductor rail or on an upper surface of the conductor rail and a lower surface of the conductor rail, respectively,
   wherein the accommodation concave portion has convex portions on inner surfaces thereof, the convex portions being at positions corresponding to the concave portions, respectively,
   wherein the convex portions are in direct contact with the concave portions, respectively, and
   wherein, in a cross-sectional view of the support portion and the conductor rail, gaps are defined at both opposite sides of each of the convex portions.

2. The guide track for a track-based vehicle according to claim 1, wherein
   the accommodation concave portion includes the protection member.

3. The guide track for a track-based vehicle according to claim 1,
   wherein an inner surface of the accommodation concave portion is in surface contact with a surface of the conductor rail.

4. The guide track for a track-based vehicle according to claim 3,
   wherein the accommodation concave portion has a U-shape when viewed from a cross section, and has an opening portion which faces outward in the width direction, and
   wherein the power collection shoe is pressed to the conductor rail through the opening portion.

5. A transportation system comprising:
   the guide track for a track-based vehicle according to claim 1; and
   the track-based vehicle that is guided by the guide track and runs.

6. The transportation system according to claim 5, wherein a separation interval of the pair of guide surfaces of the guide track is smaller than a sum of diameters of the guide wheels, and
   the guide wheels for the track-based vehicle are positioned so that positions thereof in the front and back direction along the predetermined traveling course are different from each other.

7. A transportation system comprising:
   the guide track for a track-based vehicle according to claim 2; and
   the track-based vehicle that is guided by the guide track and runs.

8. The transportation system according to claim 7, wherein a separation interval of the pair of guide surfaces of the guide track is smaller than a sum of diameters of the guide wheels, and
   the guide wheels for the track-based vehicle are positioned so that positions thereof in the front and back direction along the predetermined traveling course are different from each other.

* * * * *